United States Patent

[11] 3,603,933

[72] Inventor Siegfried Biedermann
Schellenberg, Liechtenstein
[21] Appl. No. 25,674
[22] Filed Apr. 6, 1970
[45] Patented Sept. 7, 1971
[73] Assignee Uninorm Anstalt
Vaduz, Liechtenstein

[54] APPARATUS FOR THE TRANSMISSION OF INFORMATION
6 Claims, 4 Drawing Figs.

[52] U.S. Cl. ........ 340/172.5
[51] Int. Cl. ........ H04g 5/00
[50] Field of Search ........ 340/172.5, 151, 163, 147, 164

[56] References Cited
UNITED STATES PATENTS 3,522,588 8/1970 Clarke, Jr. et al. ............ 340/163 X

*Primary Examiner*—Paul J. Henon
*Assistant Examiner*—Ronald F. Chapuran
*Attorney*—Ernest G. Montague

ABSTRACT: An apparatus for transmission of informations between a plurality of subscriber stations over a common transmission path for light call devices, light call speaking devices, observation devices, remote power devices, persons investigation devices, remote indicators, remote control means and the like, which comprises means for operating receivers of the subscriber stations upon occurrence thereon of a predetermined binary code delivered by an impulse generator over a counter chain including flip-flops. At least to two subscriber stations each are coordinated a predetermined time section divided into at least two part-time periods, in the manner of a time multiplex system. A connection between the subscriber stations is performed by the binary code during the subscriber time period within one time period of the part-time periods and transmits within the other of the part-time periods informations between the subscriber stations, whereby the outputs of the individual steps of the counter chain are fed to signal conduits serving the address and information transmission and an output of a flip-flop delivering a phase frequency to a phase conduit serving the phase transmission. All subscriber stations are disposed over an address-decoding circuit, the inverting AND gates of the latter and diodes for at least two subscriber stations coordinated to each other for the selection of the same binary code are transmitted in the address period equally to the signal conduits, as well as to the phase conduit, whereby for the transmission of informations the one input of a storage is connected to the output of the address-decoding circuit, the other input of the storage is disposed by means of intermediate members on the phase conduit, and the output of which leads to an input of a receiving storage controlling the receiving device, the other output of which is connected with one of the signal conduits, and for emitting the informations the output of the address coding circuit is in connection by means of a switching device likewise with one of the signal conduits.

INVENTOR.
Siegfried Biedermann
BY Bennett & Montague
attorney

INVENTOR.
Siegfried Siedermann

BY Ernest F. Montague
Attorney

INVENTOR.
Siegfried Biedermann
BY
Ernest G. Montague
Attorney

INVENTOR.
Siegfried Biedermann

BY Ernest G. Montague
Attorney

APPARATUS FOR THE TRANSMISSION OF INFORMATION

The present invention relates to an apparatus for transmission of informations between a plurality of subscriber stations over a common transmission path for light call devices, light call speaking devices, speaking devices, observation devices, remote power devices, person investigation devices, remote indicators, remote control means, and the like in which the receiver of the subscriber stations is operated then only, if on the latter a predetermined binary code, delivered by an impulse generator over a counter chain consisting particularly of flip-flops, occurs.

The present invention relates, first of all, also to light call speaking devices, as they are applied for example in hospitals for the transmission of information between nurses chambers and patient chambers, as well as to devices for observation of banks, industrial plants and the like.

The enterprises known so far as wire operated plants have the drawback that for performing a multiple of different informations, for example a person call, a receipt confirmation, a radio transmission, a telephone conference, light signal transmissions, switching order transmissions, alarm signal transmissions, and the like, a great number of conduits is required. Furthermore, expensive relay stations are necessary, which must be arranged as group or central positions, in order to be able to perform all switching functions and transmission paths.

The wireless arrangements save though the expenditure for the conduits and partly also the relay stations, they are, however, in their structure very complicated and very sensitive against listening in and disturbances. Only by increased technical expenditure can the selective call devices be created, which are, however, no more economically applicable for a greater number of extension stations.

It is, therefore, one object of the present invention, to provide an apparatus for transmission of informations between a plurality of stations, in which the drawbacks of the known devices are extensively avoided, conduit material is economized, the possibility of disturbances as disturbing frequencies is reduced and in which with a low conduit expenditure a relatively great number of extension stations is connectable. Relay stations should as much as possible be avoided. Also a reciprocating traffic between a plurality of stations should be possible. Furthermore, the possibility should exist to connect movable additional stations to any selective points of the device by means of plugs.

By the U.S. Pat. No. 3,134,961 and the corresponding German Pat. No. 1,094,638, respectively, already a code selector for the receiver of a person-searching device has been known, wherein a calling device is operated in a predetermined receiver then only, if a predetermined binary code appears on one conduit of the receiver, to which the selector is to respond, whereby the first impulse of the arriving from a code consisting of a series of impulses succeeding in a predetermined time period releases a phase generator circuit, the control impulses of which switch through in the phase of the arriving impulse succession the working circuit of a ring counter, in which the outputs of the individual steps switched together according to the own code of the receiver are connected together with the inputs of a door circuit, in which the individual impulses of the ring counter steps are comparable with the individual impulses of the arriving code and upon termination of a complete working cycle the impulse of the last step of the ring counter does not release any call, if upon a noncoincidence of the arriving impulse coming with its own code by the door circuit has prevented the call by a lock circuit, while the impulse of the last step of the ring counter releases the call, if upon coincidence of its own code and of the impulses the locking circuit has opened.

It has been proposed already, in order to transform simultaneously from a plurality of extension stations to a main station and vice versa information simultaneously, as well as main and extension stations by means of a conduit having at least two leads, in particular three leads, in the form of a time multiplex system to coordinate to each receiver a predetermined time period (subscriber time), whereby during this subscriber time within one part-time period the receiver is selected by the binary code and within the second part-time period information is transmitted to this receiver, whereby for the securing of the time periods over a conduit common to all stations synchronously running counter chains and connectable to the impulse generator are provided which counter chains have as many flip-flops, as are required, by the given binary code determined by the flip-flops, for the number of provided channels, whereby on the counter chains of the stations coordinated to each other are connected decoding circuits, particularly gates, responding to the same counter position, which decoding circuits serve between the impulses of the gaps of the transmission of the informations which impulses are disposed on the raster set to the conduit of the impulse generator, upon termination of one or a plurality of part-time periods for the synchronization of the total device, a synchronous impulse is transmitted particularly by filling out of the last impulse gap and for all or a plurality of the stations (extension stations) connectable to the transmission path, at least a joint main station is provided.

The aim of the present invention resides in the fact that the counter chains of this device are appreciably reduced.

The present invention is based on the concept to provide for the entire apparatus only a single counter chain connected to an impulse exciter and to guide the outputs thereof over parallel conduits to the extension stations, so that the counter chains and all synchronization measures are superfluous.

It is another object of the present invention to provide an apparatus for the transmission of information, wherein in the manner of a time multiplex system at least to two subscriber stations are coordinated a time period divided in at least two part-time periods (subscriber time), whereby during this subscriber time within the one part-time period (addressing time) the connection between the extension stations is brought about by the binary code and within the second time period (information time) information is transmitted between these subscriber stations, whereby the outputs of the individual steps, in particular of the flip-flops of the counter chain, signal conduits serving the address and information transmission and an output of a flip-flop or the like delivering the phase frequency is guided to a phase conduit serving the phase transmission. Furthermore, all subscriber stations are switched over an address decoding circuit, the inverting AND gates, diodes or the like are switched for at least two subscriber stations to be coordinated to each other for the selection of the same binary code equally transmitted in the address time period, on the signal conduits as well as on the phase conduits in a parallel arrangement, whereby for the information transmission to the output of the address decoding circuit the one input of a storage is connected, the other input of the storage being arranged under circumstances over intermediate members on the phase conduit and the output of which guides, on the one hand, to an input of a receiving storage controlling the receiving device, while, on the other hand, its other input is connected with one of the signal conduits and whereby for the emitting of the information the output of the address-decoding circuit is connected over a switching device likewise with one of the signal conduits.

Based on these measures more conduits are required than in an apparatus in which in all extension stations are provided counter chains, however, in the device of the present invention so many informations can be transmitted simultaneously as signal conduits are present, whereby also each subscriber station can be supplied with an equal number of different information.

Advantageously merely the ones, by example, the Q-outputs of the individual steps, in particular of the flip-flops, of the counting chain with an intermediate negating AND gate, the second inputs of which are connected parallel to the Q-output of a flip-flop or the like delivering the phase frequency and preset to the counter chain, on the signal conduits, whereby, by example, the Q-output of the flip-flop delivering the phase frequency by an inverter and the Q-output of this flip-flop, respectively, directly to the phase conduit.

Suitably the decoding circuit has two inputs, whereby for receiving of the address code (binary number) to be coordinated to the prevailing subscriber station over the one input of the anodes, leading to the base of a transistor, over the second input, leading the emitter of a second transistor, the cathodes of diodes and the other electrodes of these diodes to one of the conduits connecting together one of the many subscriber stations and whereby for obtaining a symmetrical disturbance distance a power divider is provided, which delivers to the base and the emitter of the transistors, respectively, as increased reference voltage.

With these and other objects in view, which will become apparent in the following detailed description, the present invention will be clearly understood in connection with the accompanying drawings, in which.

Figure 1:
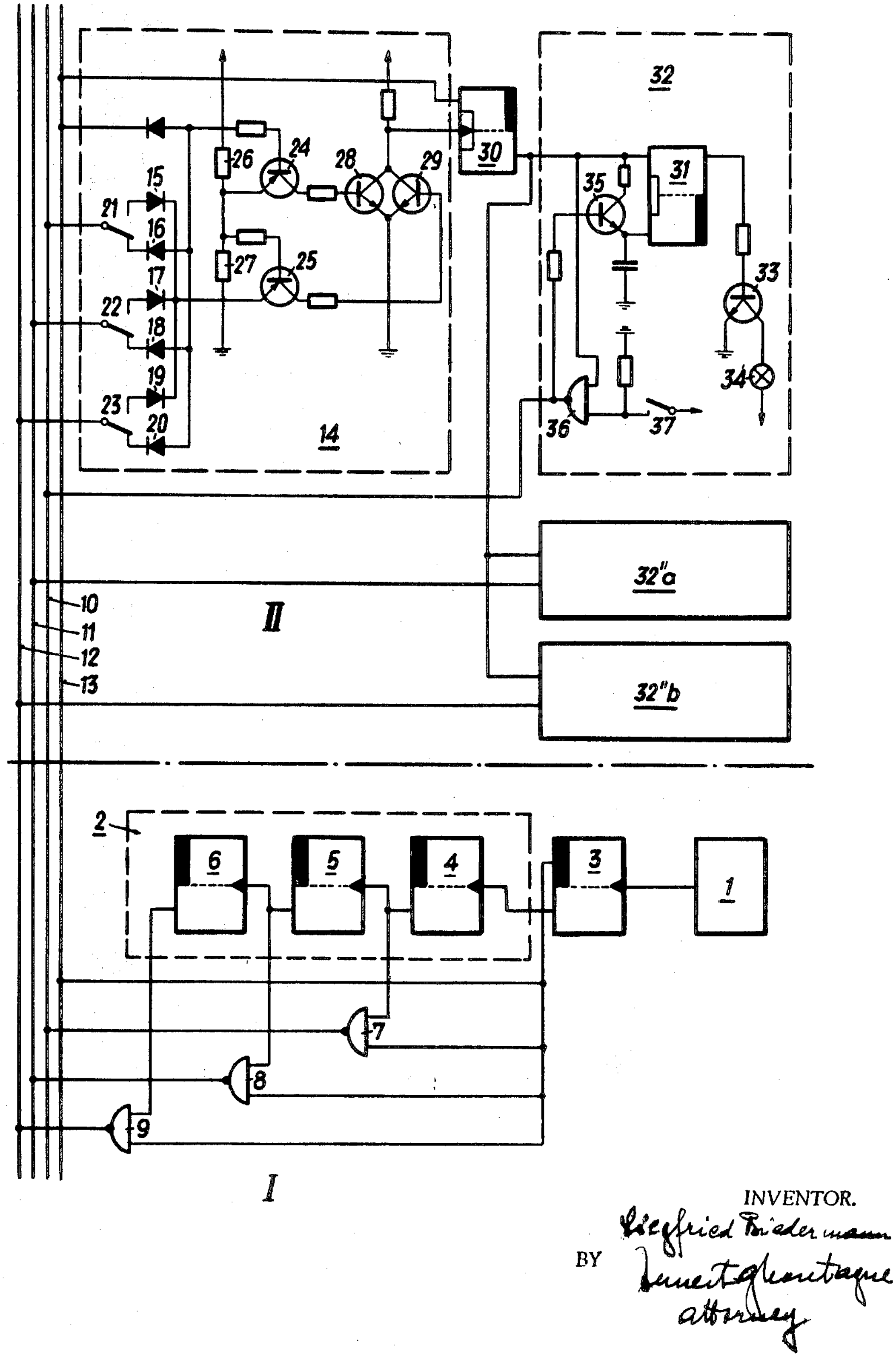
FIGS. 1 and 3 show principally simplified switching images of two devices designed in accordance with the present invention.

Referring now to the drawings, the gates shown in the drawing are formed throughout as inverting AND gates. In the shown embodiments, a phase indicator I is provided jointly for all subscriber stations, to which all subscriber stations are connected, whereby always only one subscriber station II is disclosed, because the circuit of all subscriber stations is in principle equal.

In the embodiment according to FIG. 1 the phase indicator has a multivibrator as an impulse generator 1, which leads over a flip-flop 3 to a counter chain 2, which comprises three flip-flops 4, 5, 6, the Q-outputs of which are fed to the gates 7, 8 and 9, the outputs of the latter again are connected to three conduits 10, 11 and 12, which jointly with the phase conduit 13 lead parallel to all subscriber stations.

Each of the subscriber stations II is connected to the conduits 10, 11, 12 and 13 by means of a decoding circuit 14 containing the diodes 15, 16, 17, 18, 19 and 20, the diodes of the decoding circuit 14 being selectively connectable by means of switches 21, 22 and 23 to the three conduits 10, 11 and 12, whereby two subscriber stations, coordinated to each other, between which an information is to be transmitted, can be switched corresponding with the binary code characterizing these two subscriber stations.

The outputs of the diodes switched in the same direction are guided jointly to the base and the emitter, respectively, of a transistor 24, 25 each. By the power divider formed by both resistances 26 and 27, a reference voltage of 12 V is preset for the emitter of the transistor 24 and the base of the transistor 25, whereby a symmetrical disturbance distance of about 11 volts is obtained. Voltages in the conduits 10, 11 and 12 within the range of 0 to 11 v. are recognized as logic 0, within the range of 13 to 25 v. as logic 1.

The collectors of the transistors 24, 25 lead to the base of one of the transistors 28 and 29, the collectors of which are switched together to a storage 30, the second input of which is in operative connection with the phase conduit 13. The output of the storage 30 leads to a receiving storage 31 of the subscriber circuit 32, which controls over a transistor 33 the receiving apparatus, in the shown example, an incandescent lamp 34.

The other input of the receiving storage 31 is connected to one of the conduits with an intermediate arrangement of a transistor 35 and in the disclosed example to the conduit 10, which is coordinated to the information, which causes the lighting of the incandescent lamp 34. The output of a gate 36 is connected to the same conduit 10, the inputs of the gate 36 leading, on the one hand, to the output of the storage 30, and, on the other hand, to a key 37.

In the embodiment set forth in FIG. 1 the connection of two further subscriber circuits 32′ and 32″ of the same subscriber station II to the output of the storage 30 is indicated. The structure of these subscriber circuits correspond completely to the structure of the subscriber circuit 32, yet the input of the transistor corresponding with the transistor 35 of the subscriber circuit 32 and the output of the gate corresponding with the gate 36 of the subscriber circuit 32 are connected to the conduit 11 and 12, respectively.

In this manner can the subscriber station II be supplied with three different informations, which can be received all and can be sent, respectively, from the further subscriber station having the same codification.

Figure 2:
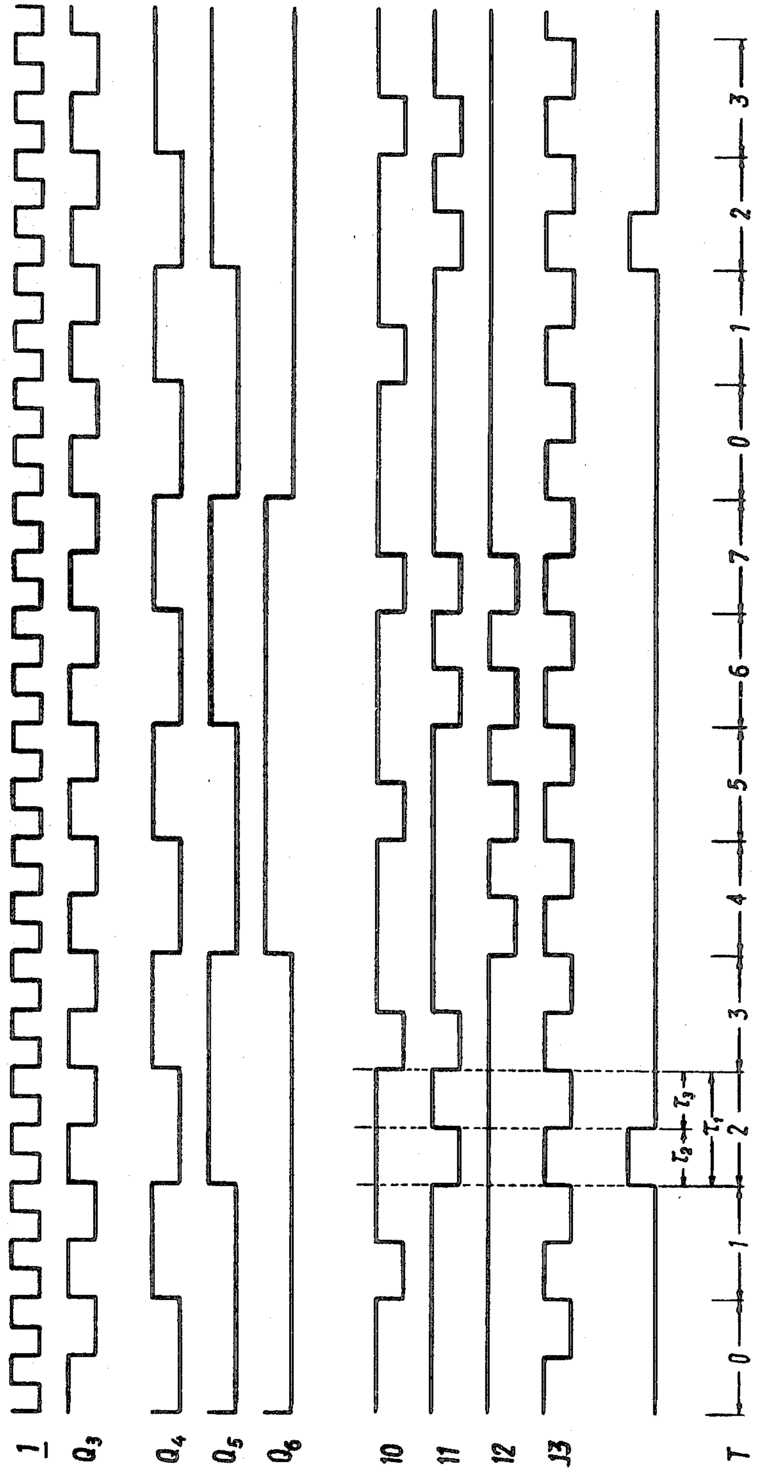
FIG. 2 is an impulse plan for the embodiment disclosed in FIG. 1.

FIG. 2 discloses the impulse plan for the example disclosed in FIG. 1. In the upper half are disclosed the impulse sequences occuring at the outputs of the impulse generator 1 and of the flip-flops 3, 4, 5 and 6, whereby the indices and the numerals correspond with the numerals according to FIG. 1. Therebelow are provided the impulse sequences occuring in the conduits 10, 11, 12 and 13, which impulse sequences are provided with the numerals indicating the conduits. These impulse sequences are arranged at the inputs of all subscriber stations.

The codification characterizing two subscriber stations coordinated to each other each takes place by the corresponding position of the switches 21, 22 and 23. Depending upon the position of the switches 21, 22 and 23 one of the time sections $T_0$, $T_1$, $T_2$, etc. is coordinated to the subscriber stations. By the position of the switches 21, 22 and 23, shown in FIG. 1, it results for this subscriber station the coordination of the time section $T_2$. Each of these time sections has a duration of a subscriber time $\tau_1$ which is divided into two part time periods, namely the addressing time period $\tau_2$ and the information time period $\tau_3$. Within the information time period $\tau_3$ between two subscriber stations switched in accordance with FIG. 1, informations can be exchanged.

During the addressing time period $\tau_2$ in the subscriber stations connected by means of the switches 21, 22 and 23 and by means of the storages 30 at first the receiving storages 31 are prepared. If now in the one of the subscriber stations the key 37 is operated, the information impulse moves over the gate 36 of the one subscriber station to the conduit 10 and from the latter by means of the transistor 35 of the second subscriber station to the second input of the receiving storage 31, whereby the incandescent lamp 34 is brought to light up by means of the transistor 33.

Figure 3:
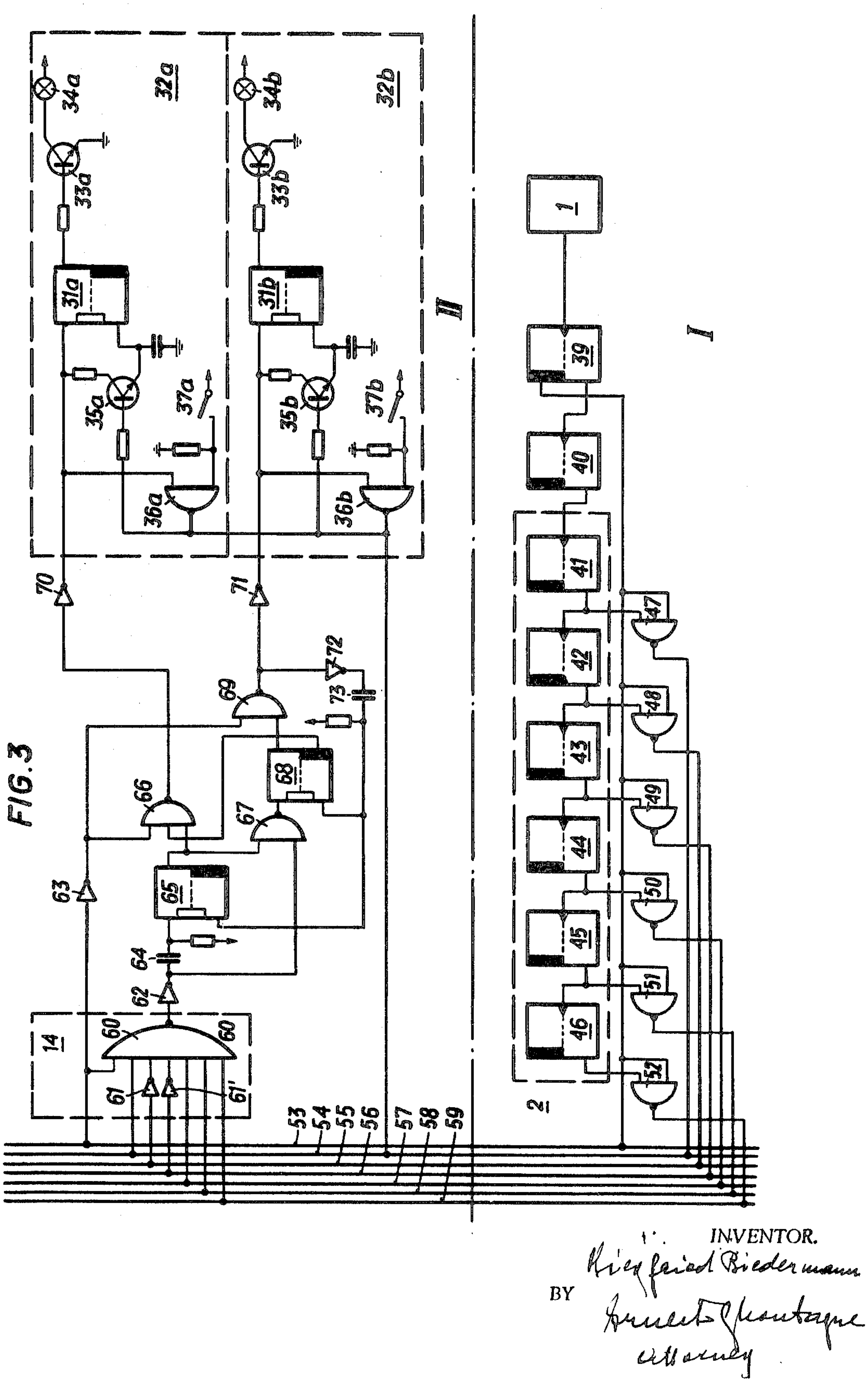

FIG. 3 discloses an embodiment for distinction of the informations upon double sending of the address for each subscriber station.

In this embodiment likewise an impulse generator 1 is provided, which leads over two flip-flops 39 and 40 to a counter chain 2. Here the counter chain 2 comprises six flip-flops 41, 42, 43, 44, 45 and 46. The flip-flop 39 delivers the phase impulse sequence I ($Q_{39}$ in FIG. 4). The flip-flops 41, 42, 43, 44, 45 and 46 are fed to the gates 47, 48, 49, 50, 51 and 52, the second inputs of which are connected with the Q-output of the flip-flop 39. The outputs of the gates 47, 48, 49, 50, 51 and 52 and the output of the flip-flop 39 lead each to one of the conduits 53, 54, 55, 56, 57, 58 and 59, whereby the conduit 53 constitutes the phase conduit. All these conduits lead parallel to all subscriber stations.

Deviating from the decoding circuit 14 shown in FIG. 1, the circuit 14 has in FIG. 3 a gate 60, the inputs of which lead directly to the conduits 54, 57, 58 and 59 and over inverters 61 and 61′ to the conduits 55 and 56. For other codifications than those which are shown, the distribution of the inputs or of the gate 60 connected directly and over inverters, respectively, is to be selected accordingly. A storage 65 is connected to the gate 60 by means of an inverter 62 and a condenser 64, which storage 65 leads, on the one hand, to a gate 66, on the other hand, to a gate 67, the second input of which is connected with the output of the inverter 62. The output of the gate 67 leads to a storage 68, one output of which is disposed at one of the inputs of the gate 66. The second output of the storage 68 leads to a gate 69. The phase conduit 33 is disposed on the gate 60 and by means of an inverter 63 at the gates 66 and 69. The outputs of the gates 66 and 69 are disposed each on an inverter 70 and 71, whereby the output of the gate 69 is fed in addition over an inverter 27 and a condenser 73 to the second input of the storages 65 and 68.

The outputs of the inverters 70 and 71 are fed to a subscriber circuit 32*a* and 32*b*, each, which subscriber circuit 32*a* and 32*b* is equal to the subscriber circuit 32 in accordance with FIG. 1, whereby the same parts are provided with the same numerals, which, however, are provided with the indicies *a* and *b*, respectively.

Figure 4:
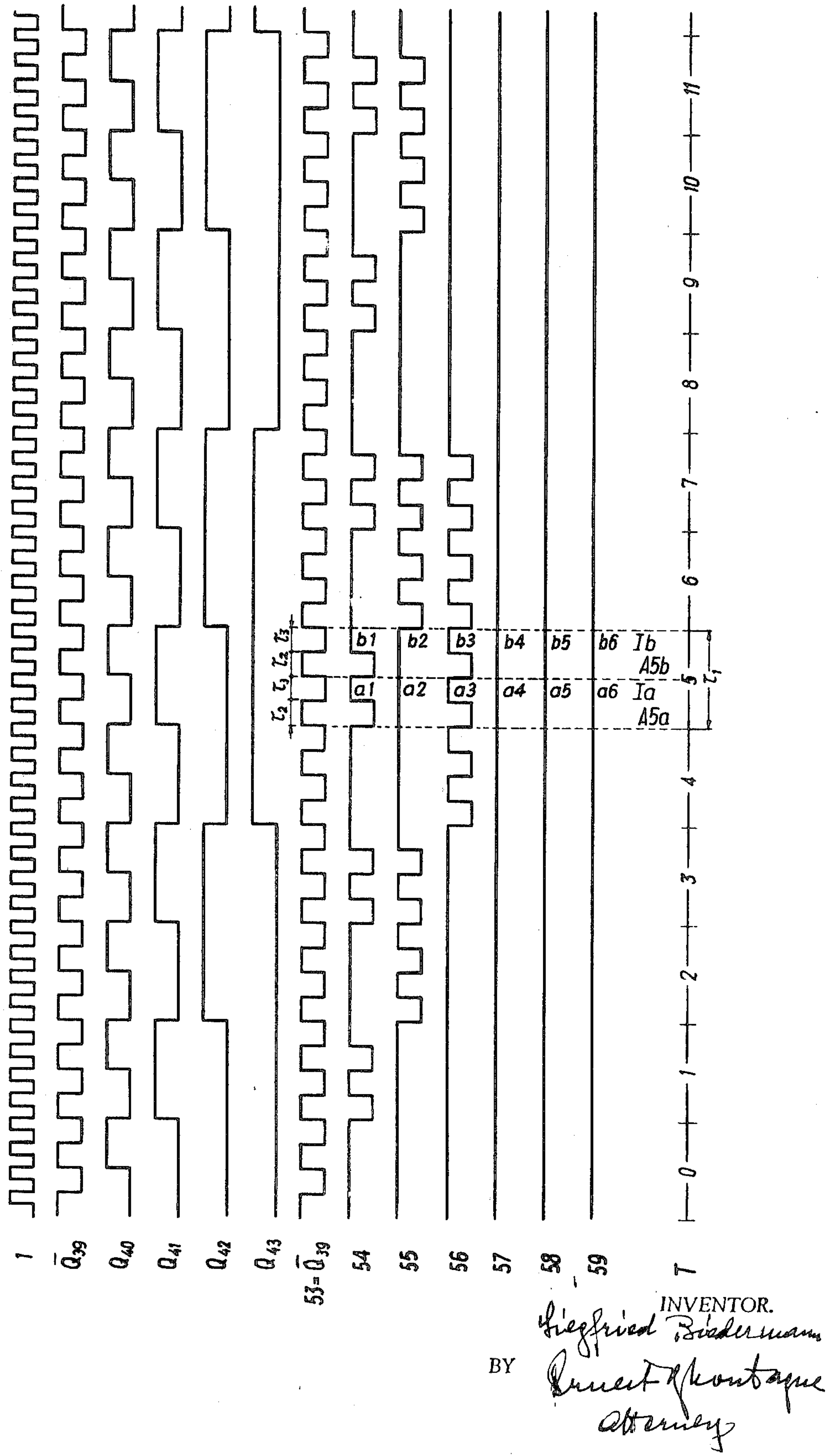
FIG. 4 is an impulse plan for the embodiment disclosed in FIG. 3.

FIG. 4 shows a part of the impulse plan of the embodiment according to FIG. 3, in which likewise in the upper part the impulse sequences occuring at the outputs of the impulse generator 1 and of the flip-flops 39, 40, 41, 42 and 43 are shown. The indices and numerals, respectively, correspond thereby to the numerals of FIG. 3. Among them are arranged the impulse sequences occuring in the conduits 53, 54, 55, 56, 57, 58 and 59, which are characterized by the numerals indicating the conduits. Among them are shown the time sections $T_0$, $T_1$, $T_2$, etc. for the individual subscribers.

Within the time period available for a subscriber (for example time section $T_5$, according to FIG. 4), the address is sent twice. The subscriber time period $\tau_1$ is here divided into four part-time periods, whereby in each half of this subscriber time period the address (A5*a* and A5*b* ) and following the latter, an information (for example I*a*1 and I*b*1, respectively) are transmitted. Since the information transmission takes place over one of the conduits 54, 55, 56, 57, 58 and 59, thus each subscriber station can be supplied with totally12 informations, as long, as a matter of course, are provided also 12 subscriber circuits 32.

Upon arriving of the address impulses A5*a* at first the storage 65 is set over the condenser 64. In the gate 66 the phase determines the impulse emitted over the inverter 70 during the information period. Over the gate 67 the storage 68 is set with the address *b*. With the phase an impulse is emitted during the information period *b* over the gate 69. At the end of the information period *b* the storages 56 and 68 are set back by the 0–1 transmission of the phase over the inverter 72 and the condenser 73.

It is apparent that the phase generator I as the subscriber stations II can be connected at any selected station of the conduit system comprising the conduits 10, 11, 12 and 13 and 53, 54, 55, 56, 57, 58 and 59, respectively. Likewise a plurality of subscriber stations II can be coordinated to each other by the same codification.

Yet also a plurality of subscriber stations of different codifications can be joined together to a main station, from which an information exchange with the connected subscriber stations can be performed.

While we have disclosed several embodiments of the present invention, it is to be understood that these embodiments are given by example only and not in a limiting sense.

I claim:

1. An apparatus for transmission of informations between a plurality of subscriber stations over a common transmission path for light call devices, light call speaking devices, observation devices, remote power devices, person investigation devices, remote indicators, remote control means and the like, comprising means for operating receivers of said subscriber stations upon occurrence thereon of a predetermined binary code delivered by an impulse generator over a counter chain including flip-flops, at least to two subscriber stations each being coordinated a predetermined time section divided into at least two part-time periods, in the manner of a time multiplex system, a connection between said subscriber stations being performed by the binary code during said subscriber time period within one time period of said part-time periods and transmitting within the other of said part-time periods informations between said subscriber stations, whereby the outputs of the individual steps of said counter chain are fed to signal conduits serving the address and information transmission and an output of a flip-flop delivering a phase frequency to a phase conduit serving the phase transmission, all subscriber stations being disposed over an address decoding circuit, the inverting AND gates of the latter and diodes for at least two subscriber stations coordinated to each other for the selection of the same binary code transmitted in the address period equally to said signal conduits, as well as to said phase conduit, whereby for said transmission of informations the one input of a storage is connected to the output of said address decoding circuit to the other input of said storage being disposed by means of intermediate members on said phase conduit and the output of which leads to an input of a receiving storage controlling the receiving device, the other output of which being connected with one of said signal conduits, and for emitting said informations the output of said address coding circuit being in connection by means of a switching device likewise with one of said signal conduits.

2. The apparatus, as set forth in claim 1, wherein the one output of the individual steps of said flip-flops of said counter chain are connected with intermediate arrangement of inverting AND gates, the second inputs of which are parallel to the output of a flip-flop preset to said counter chain delivering said phase frequency, said flip-flops being disposed on said signal conduits, and said output of said flip-flops delivering said phase frequency is connected by means of an inverter and an output of said flip-flop, respectively, directed with said phase conduit.

3. The apparatus, as set forth in claim 1, wherein said decoding circuit has two inputs whereby for obtaining of address codes to be coordinated to a prevailing subscriber station over the one input leading to the base of a transistor are connected anodes over the second input leading to an emitter of a second transistor, the cathodes of diodes and the other electrodes of said diodes to conduits connecting together all subscriber stations each, and whereby for the obtaining of a symmetric disturbance distance a power divider is provided which delivers to the base and the emitter of the transistors, respectively, an increased reference voltage.

4. The apparatus, as set forth in claim 1, wherein for enlargement of the subscriber time period determined by the counter chain between the information of the address code capable of being transmitted between two subscriber stations are sent for each subscriber several times.

5. The apparatus, as set forth in claim 4, wherein the phase frequency is double the amount as the first phased counter frequency.

6. The apparatus, as set forth in claim 4, which includes a storage connected with said address decoding circuit, two inverting AND gates operatively connected with said storage, whereby in said one inverting AND gate the phase determines the impulse emitted over an inverter during said first information time period while the other inverting AND gate is connected with a further storage, and the output of the latter delivers an impulse during the second information time period by means of a third inverting AND gate connected with said phase conduit.